July 31, 1956  E. L. WILSON  2,756,514
COUNTERCURRENT CASCADE STRIPPER
Filed Nov. 12, 1953
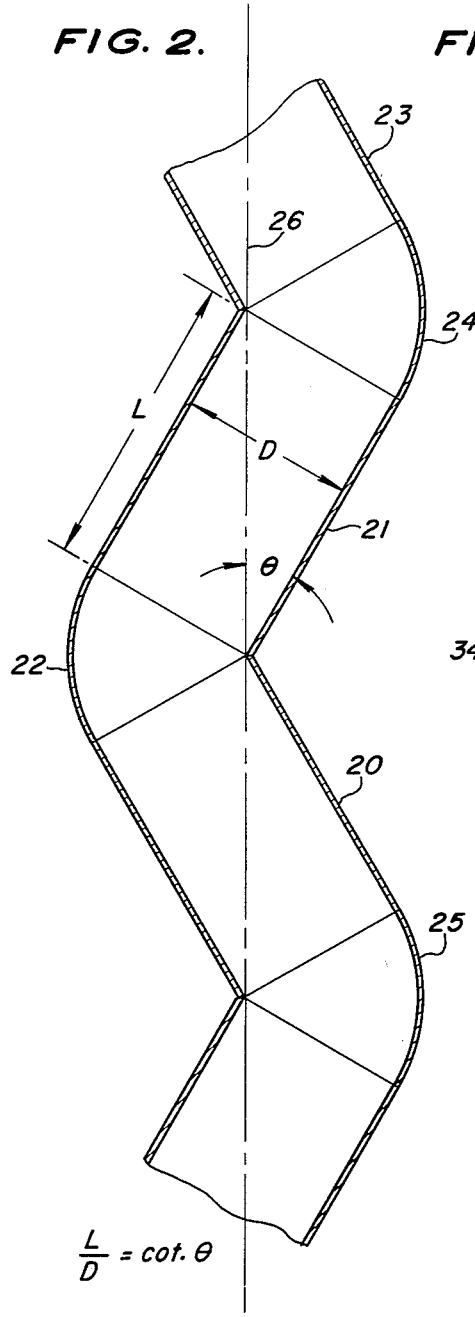
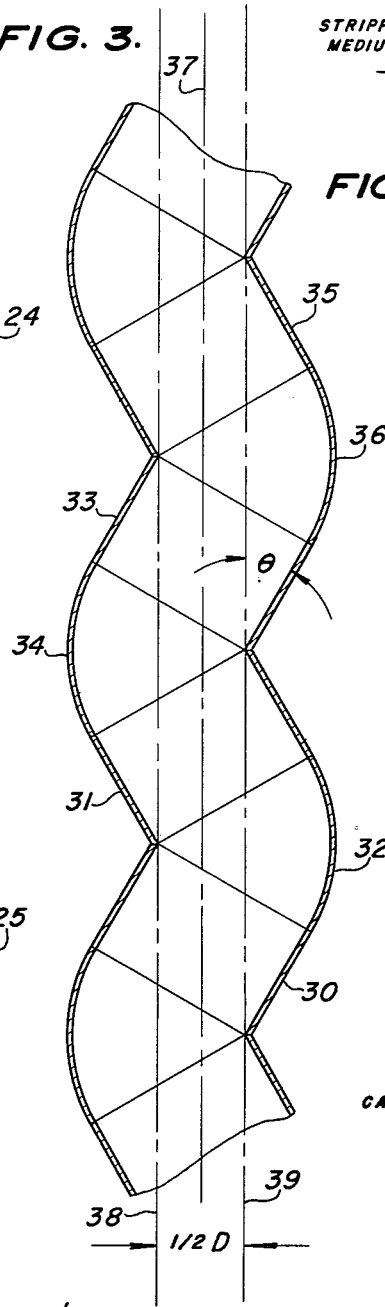
$\dfrac{L}{D} = \cot\theta$
$\dfrac{L}{D} = \cot\theta - 1/2\,\mathrm{cosec}\,\theta$
INVENTOR.
Edward L. Wilson,
BY
ATTORNEY.

United States Patent Office 2,756,514
Patented July 31, 1956

2,756,514
COUNTERCURRENT CASCADE STRIPPER

Edward L. Wilson, Baytown, Tex., assignor, by mesne assignments, to Esso Research and Engineering Company, Elizabeth, N. J., a corporation of Delaware Application November 12, 1953, Serial No. 391,536

1 Claim. (Cl. 34—168)

The present application is directed to a countercurrent cascade stripper for stripping vaporizable material from finely divided solids.

It is desirable to strip vaporizable materials from finely divided solids. As an example, in the catalytic cracking of petroleum fractions a finely divided catalyst may be employed in a fluidized form for carrying out the catalytic reaction and said finely divided solid or fluidized catalyst is then subjected to a steam stripping operation to remove vaporizable materials from the catalyst before it is sent to a regenerator where carbon is burned from the catalyst to regenrate it for further use. The present invention is directed to a countercurrent cascade stripper particularly useful for stripping vaporizable material from fluidized finely divided catalyst.

Other objects and advangates of the present invention may be seen from the following description taken in conjunction with the drawing in which Fig. 1 is in the form of an elevation showing an embodiment of the present invention;

Fig. 2 is a fragmentary view in section showing in greater detail the constructional features of an embodiment of the present invention; and, Fig. 3 is a fragmentary view showing constructional details of another embodiment of the present invention.

Turning now specifically to the drawing and first to Fig. 1, a countercurrent stripper A made in accordance with the present invention is provided with an upper inlet line 11 for introducing fluidized catalyst into the stripper and an outlet 12 for removing catalyst from the stripper. The device is also provided with an inlet line 13 at its lower end for introducing a stripping medium such as steam and an outlet 14 at its upper end for removing spent stripping medium.

In Fig. 1 it will be seen that the finely divided catalyst is introduced in the upper end of the device and flows downwardly countercurrent to a stream of a selected stripping medium which is introduced into the lower end of the device. The stripped catalyst is removed through outlet line 12 substantially free from vaporizable material while the stripping medium in admixture with vaporized material stripped from the catalyst is removed from the upper end of stripping vessel A by means of outlet line 14.

The constructional details for an embodiment of the present invention are shown in Fig. 2. As shown in this embodiment, hollow elongated sections 20 and 21 have their adjacent ends connected by member 22. The lower end of another section 23 is shown with its lower end connected to the upper end of section 21 by member 24. The part of another member 25 which is similar to members 22 and 24 is connected to the lower end of section 20. Sections 20, 21 and 23 are of uniform cross sectional area and the member 22 joining sections 20 and 21 also has the same cross sectional area. Sections 20 and 21 and similarly sections 21 and 23 have a portion of adjacent ends in contact. The sections 20, 21 and 23 are symmetrically arranged and as shown in the drawing make the angle $\theta$ with the vertical.

In the embodiment of Fig. 2, dashed line 26 represents the symmetrical axis of the structure. L represents the length of each of the sections, two of which are shown as 20 and 21 and D represents the width of each section, D being perpendicular to the axis of the section. In the embodiment of Fig. 1, the following relation holds $$\frac{L}{D} = \cot \theta$$

In the embodiment of Fig. 3, sections 30 and 31 are joined by section 32, sections 31 and 33 are joined by section 34 and sections 33 and 35 are joined by section 36. These sections are symmetrically arranged with respect to the axis of the apparatus shown as dashed line 37. As seen in the drawing, the point where sections 31 and 30 and 33 and 35 make contact lie on a line 38 which is parallel to and spaced to the left away from axis 37 while the point at which sections 31 and 33 come into contact lies on a dashed line 39 which is parallel to and spaced to the right away from axis 37. In the embodiment of Fig. 3, if the length of sections 31, 33 and 35 equals L, then the points at which the straight sections are joined together are spaced away from axis 37 a distance equal to ¼ D where D represents the width of the sections so that the horizontal distance separating lines 38 and 39 equals ½ D. Thus, the relationship of the parts of the structure of Fig. 3 may be expressed as follows:

$$\frac{L}{D} = \cot \theta - \tfrac{1}{2} \csc \theta$$

The relationship of the parts shown in Figs. 2 and 3 illustrates the limits for the structure of the present application. If the dimensions shown in the embodiment of Fig. 2 are changed by increasing L with respect to D the number of contacting stages diminishes for a given stripper height. If the dimensions shown in the embodiment of Fig. 3 are changed by decreasing L with respect to D there is excessive gas bypassing in the stripping operation. Fig. 2 may be said to represent maximum contacting efficiency for the number of contacting stages available and when the dimensions are changed in the direction of the embodiment of Fig. 3 contacting stages are gained (for a fixed height of apparatus) although contacting efficiency diminishes. The limits of the relationships shown by Figs. 2 and 3 may be defined by the following mathematical expression:

$$\cot \theta \geq \frac{L}{D} \geq \cot \theta - \tfrac{1}{2} \csc \theta$$

where:

L is the length of a straight section of the stripper
D is the width of a straight section of the stripper
$\theta$ is the angle described by a wall of a straight section of the stripper with the vertical.

Expressed differently, it may be said that the ratio $L/D$ will lie in a range which may be expressed in terms of the angle $\theta$ and will have a value defined by the limits $\cot \theta$ and $\cot \theta - \tfrac{1}{2} \csc \theta$.

For convenience in constructing the countercurrent cascade stripper of the present application, it will usually be more convenient to form the straight sections of tubular members such as pipe and to join the ends of the tubular sections together with bends of circular cross section because these elements are readily commercially available. However, cross sections of other geometric shapes may be employed. For example, rectangular or triangular shapes may be used.

The present invention having been fully described and illustrated, what is desired to be secured by Letters Patent is:

A structure adapted to be used for countercurrent stripping of vaporizable materials from finely divided solids by passing the solids downwardly countercurrently to upflowing stripping fluid consisting of a plurality of hollow elongated sections with the end boundaries perpendicular to the sides, the ends of adjacent sections having a portion in contact and the remainder joined together by members defining cross sections equal in area to that of the elongated sections, said elongated sections being symmetrically arranged with respect to a longitudinal axis and in which the angles the straight sections make with the axis are within the limits defined by the expression $$\cot \theta \geqq \frac{L}{D} \geqq \cot \theta - \tfrac{1}{2} \operatorname{cosec} \theta$$

where:

L is the length of each of said hollow elongated sections,
D is the width of each of said straight elongated sections,
$\theta$ is the angle described by the wall of each of the hollow elongated sections with the longitudinal axis of the structure.

References Cited in the file of this patent

UNITED STATES PATENTS 1,446,253     Hall                    Feb. 20, 1923